(12) United States Patent
Hendriks et al.

(10) Patent No.: US 7,980,594 B2
(45) Date of Patent: Jul. 19, 2011

(54) CHASSIS FRAME ESPECIALLY FOR A HEAVY VEHICLE

(75) Inventors: Jan Hendriks, Wetteren (BE); Ayman Mokdad, Irigny (FR)

(73) Assignee: Renault Trucks, Saint Priest (FR)

( * ) Notice: Subject to any disclaimer, the term of this patent is extended or adjusted under 35 U.S.C. 154(b) by 22 days.

(21) Appl. No.: 12/518,287

(22) PCT Filed: Dec. 26, 2006

(86) PCT No.: PCT/IB2006/004162
§ 371 (c)(1),
(2), (4) Date: Jun. 9, 2009

(87) PCT Pub. No.: WO2008/078139
PCT Pub. Date: Jul. 3, 2008

(65) Prior Publication Data
US 2010/0066128 A1 Mar. 18, 2010

(51) Int. Cl.
*B62D 21/00* (2006.01)
(52) U.S. Cl. .................................... 280/781
(58) Field of Classification Search ............. 296/30, 296/204; 280/781, 785, 800; 180/311
See application file for complete search history.

(56) References Cited

U.S. PATENT DOCUMENTS

| 4,040,640 | A | 8/1977 | Begg |
| 6,010,155 | A * | 1/2000 | Rinehart ............ 280/781 |
| 6,199,894 | B1 * | 3/2001 | Anderson .......... 280/638 |
| 6,874,816 | B2 * | 4/2005 | Herrmann et al. ... 280/781 |
| 2006/0266571 | A1 | 11/2006 | Mattson |

FOREIGN PATENT DOCUMENTS

EP 1634798 A 3/2006

* cited by examiner

*Primary Examiner* — Paul N Dickson
*Assistant Examiner* — Robert A Coker
(74) *Attorney, Agent, or Firm* — WRB-IP LLP

(57) ABSTRACT

A chassis frame includes a first chassis subsection having a first width w and at least a second chassis subsection adjacent to the first chassis subsection having a width W greater than the width w of the first chassis subsection. Each chassis subsection includes a right and a left parallel C shaped frame rail inwardly open towards each other and extending longitudinally; the chassis further includes a right—respectively left—interface bracket connecting two consecutive right—respectively left—frame rails belonging to two adjacent chassis subsections; the interface bracket maintains a transversal distance D between the said two consecutive right—respectively left—frame rails belonging to two adjacent subsections and further includes at least one mounting unit on which at least one vehicular operational part is attached.

11 Claims, 6 Drawing Sheets

CHASSIS FRAME ESPECIALLY FOR A HEAVY VEHICLE

BACKGROUND AND SUMMARY

The present invention relates to a vehicle chassis frame especially for heavy vehicles, such as for example trucks and similar freight vehicles.

In the construction of a heavy vehicle a chassis frame is the main structure of the vehicle onto which the other vehicle parts and equipments are attached. A vehicle chassis frame is commonly constructed of two parallel frame rails suitably interconnected by several transversal crossmembers in a ladder like way. The frame rails are usually C-shaped steel beams having a vertical web and horizontal upper and lower flanges; the said frame rails extend from the vehicle front end to the vehicle rear end.

A cabin, axles, suspension and wheels, an engine and a drive train can be attached onto the chassis at the front portion of the heavy vehicle. On the rear portion of the heavy vehicle, the chassis frame can receive one or more driving axles and wheels and corresponding vehicle suspensions; on the rear portion, a heavy vehicle can also be equipped with trailer connection means such as, for example, a fifth wheel or a superstructure such as, for example, a loading platform, a closed container for general cargo or bulk loads, a tank for liquid loads, a tipping device for refuse collection vehicles etc. The front portion and the rear portion of a heavy vehicle have therefore to face very different structural as well as functional issues.

Nevertheless, in most heavy vehicles the chassis frame exhibits a continuous structure from the vehicle front end to the vehicle rear end.

A chassis frame has to address different and sometimes contradictory issues. A vehicle front end usually incorporates bulky parts namely a vehicle engine and its corresponding cooling package that demand a wide chassis frame to accommodate the said bulky equipment. On the other hand, a vehicle rear end demands a narrow chassis frame as several parts such as for example a fuel tank, a battery box are laterally attached on the chassis frame; it should also be mentioned that the wheels (often tandem wheels on the rear axles) are also located on the outer side of the chassis frame.

From a functional viewpoint, the rear portion and the front portion of a heavy vehicle might have different layouts to address different vehicle uses. As far as the rear portion is concerned, parameters such as the number of rear axles, the type of the suspension (pneumatic), the length of the wheel base etc can vary from vehicle to vehicle. As far as the front portion in concerned parameters such as the cabin size, engine size etc can vary according to vehicle specifications A traditional ladder type chassis frame proves unable to adapt to the technical requirements of a vehicle front portion and rear portion.

Attempts to adapt a ladder type chassis to the contradictory specifications faced respectively by a vehicle front end and by a vehicle rear end have so far been largely unsuccessful. It has been proposed to widen the front end of a ladder chassis frame by outwardly cranking each frame rail. The extra cranking operation involves however a significant cost; considering the length of the frame rails that undergo a cranking phase, it may prove difficult to maintain acceptable tolerance; this also can weaken the frame rails. A further attempt to tackle the problem of varying the width of a chassis frame for heavy vehicles consists of having part or the entire chassis frame made of tubular elements instead of the existing frame rail. This solution is not economically viable as it requires a complete redesign of the entire spectrum of vehicular equipment. It therefore appears that there is room for improvement in heavy vehicle chassis architecture.

It is desirable to provide a vehicle chassis frame especially for heavy vehicles which can be of variable width and which obviates the disadvantages of the prior art.

It is desirable to provide a vehicle chassis frame that can be easily tailored in accordance with vehicle specifications. It is desirable to provide a vehicle chassis frame that is inexpensive to manufacture.

Thus, an aspect of the invention concerns a chassis frame for a heavy vehicle comprising a first chassis subsection having a first width w and, at least, a second frame subsection adjacent to the first chassis subsection having a width W greater than the width w of the first chassis subsection; each chassis subsection comprises a right and a left parallel C shaped frame rail inwardly open towards each other and extending longitudinally; the chassis further comprises a right—respectively left—interface bracket connecting two consecutive right—respectively left—frame rails belonging to two adjacent subsections; the said interface bracket maintains a transversal distance D between the said two consecutive right—respectively left—frame rails belonging to two adjacent subsections, and include at least one mounting unit onto which a vehicular part is secured.

The invention thus provides, according to an aspect thereof, a chassis frame which, in effect, can have at least two widths. Firstly, the invention provides a versatile chassis frame constructed of a number of subsections that can each have a specific width adapted to one or more specific vehicular functions. To achieve this, the chassis frame includes at least two interface brackets that can connect two consecutive frame rails while widening the chassis frame by maintaining a transversal distance between these frame rails. Importantly, each sub section is comprised of two parallel C shaped frame rails inwardly open towards each other which mean that the vertical web of each frame rail faces outwardly. On a practical level, this point proves to be of importance as a large number of already existing vehicular parts are designed to be fastened on the outward surface of the frame rail web where fastening holes can be easily provided and where upper and lower flanges do not interfere. Secondly the interface bracket is in itself capable of receiving at least one vehicular part; attaching a vehicular part onto the interface bracket can prove advantageous insofar as the said vehicular part is not directly attached onto the frame rail and thus the interface bracket absorbs vibrations that would otherwise be directly transmitted to the chassis frame.

In practical terms, each right—respectively left—interface bracket can be interposed between two right—respectively left—consecutive overlapping frame rails.

The critical element of the chassis frame i.e. the interface bracket whether right or left can comprise:
  a central part that includes an array of spacing sleeves having a dimension D coinciding with an array of holes provided in a right—respectively left—frame rail and with an array of holes provided at the end of a subsequent right—respectively left—frame rail, and—at least one or more mounting units onto which a vehicular operational part can be secured.

The interface bracket can include one or more mounting units of the group comprising:
  a bearing provided in a lug extending downwards from the central part capable of receiving a suspension spring eye;
  a mounting lug extending upwards from the central part;
  a mounting lug extending downwards from the central part;

a mounting lug extending longitudinally from the central part;

a second array of holes, each extended by a flange ring capable of entering a second array of holes provided in the frame rails of the first chassis subsection.

In concrete term, the first chassis subsection is a rear vehicle chassis subsection and the second chassis subsection is a front chassis subsection as the need for transversal space is more acute on the front end of a vehicle where vehicular parts such as an engine and a cooling package are accommodated and the need for a narrow chassis subsection is more acute on the rear end of a chassis where vehicular parts such as a fuel tank or a battery are commonly secured on the lateral side of the chassis frame.

Each frame rail of the first chassis subsection is made of a vertical web and an upper and a lower flange that can be provided with at least one cut to allow a passage for a mounting lug extending from the interface bracket.

BRIEF DESCRIPTION OF THE DRAWINGS

The invention will be subsequently described in greater detail with reference to the attached drawings in which.

DETAILED DESCRIPTION

Figure 1:
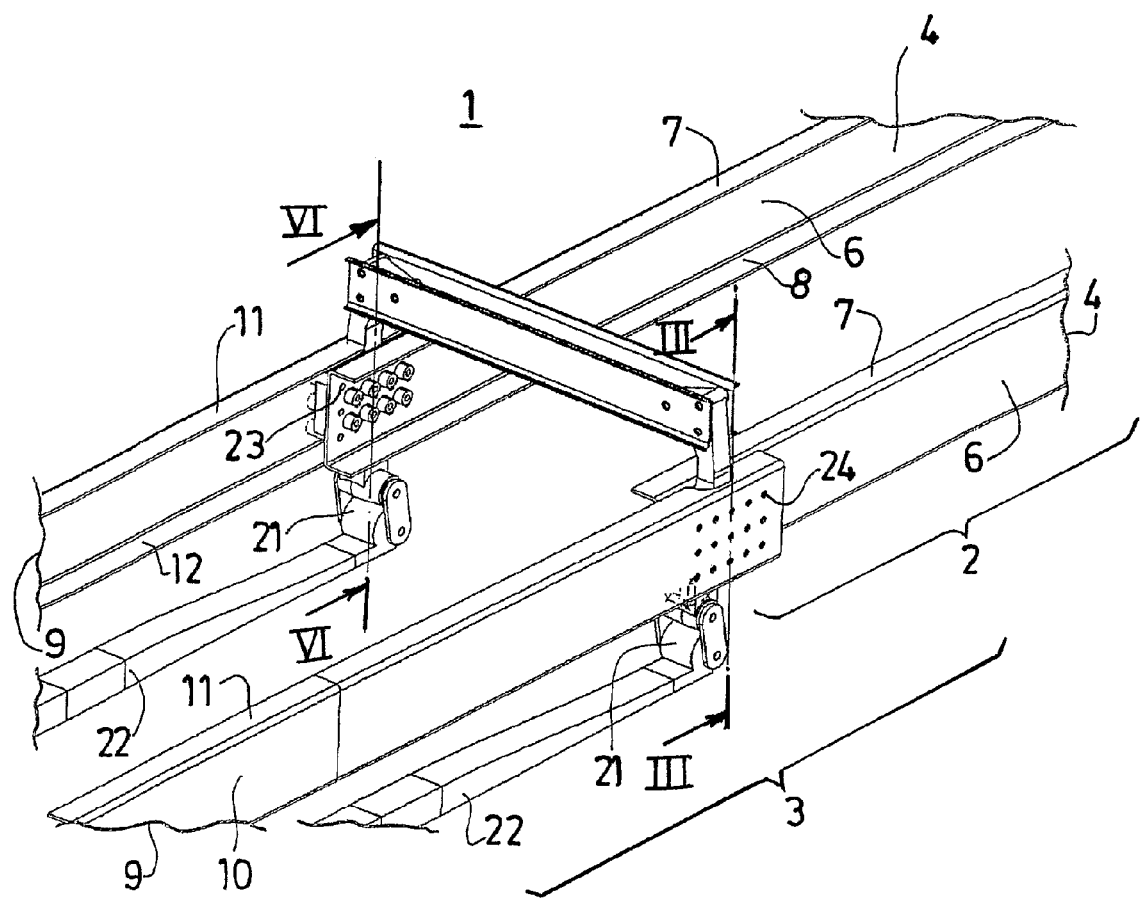
FIG. 1 shows in perspective a chassis frame according to the invention.

As depicted in FIG. 1, the chassis frame 1 is comprised of a number of chassis subsections; in the illustrated example, the chassis frame is comprised essentially of two chassis subsections namely a rear chassis subsection 2 and a front chassis subsection 3; the two rear and front subsections 2 and 3 exhibit a different width.

The rear chassis subsection 2 is constructed of two parallel right and left rear frame rails 4 that extend longitudinally. The two rear frame rails 4 are made of C-shaped steel or aluminium beams; each rear frame rail 4 has a vertical web 6 and two horizontal upper and lower flanges 7 and 8. The right and left rear frame rails 4 are inwardly open towards each other; the vertical web 6 of each frame rail 4 therefore forms the outward surface of the rear chassis subsection 2. The right and left frame rails 4 can be interconnected by transversal cross members (not shown) the number of which depends upon the type and intended use of the vehicle. The front chassis subsection 3 has a structure similar to the one of the rear chassis subsection 2. The front chassis subsection 3 includes two right and left front C-shaped front frame rails 9 that have a vertical web 10 and two horizontal upper and lower flanges 11 and 12. The right and left front frame rails are inwardly open towards each other; the vertical web of each front frame rail 9 therefore forms the outward surface of the front chassis subsection 3. A number of transversal cross members (not illustrated) can interconnect the right and left frame rails.

The connection of the rear chassis subsection 2 and the front chassis subsection 3 is achieved by two right and left interface brackets 14. As can be seen, for example, in FIG. 3 which illustrates a left hand side part of the chassis frame 1, a left interface bracket 14 is interposed between the rear left frame rail 4 and the front left frame rail 9.

Figure 3:
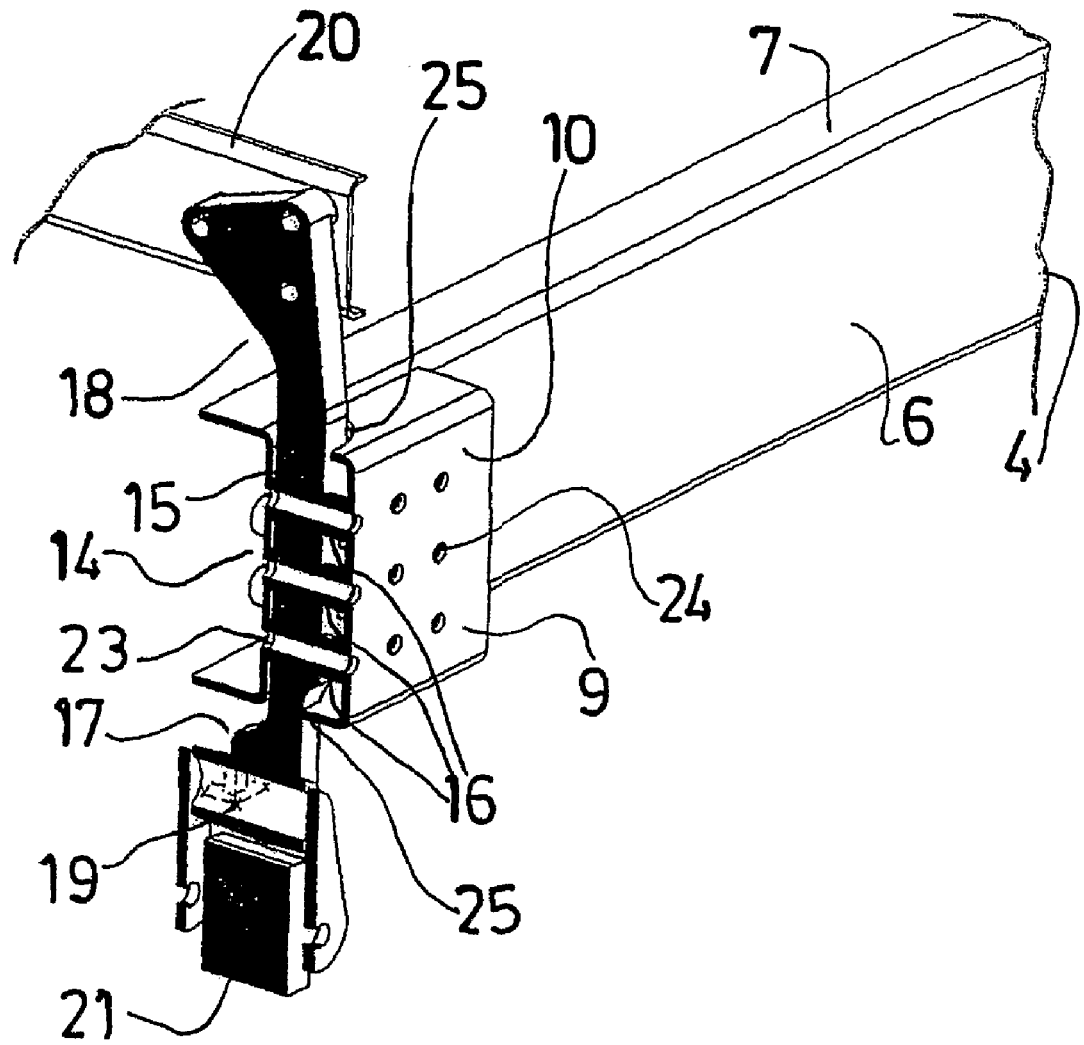
FIG. 3 is a cross section according to III-III of FIG. 1.

FIG. 3 illustrates a right hand side connection but it is understood that on the left hand side of the chassis, a symmetrical interface bracket 14 ensures that the rear left frame rail 4 and the front left frame rail 9 are duly connected.

The interface bracket 14—whether left or right—can comprise a central part 15 that is interposed between a rear frame rail 4 and a front frame rail 9 and ensures that the two rear and front frame rails 4 and 9 are secured to each other. To this end, the interface bracket 14 includes, in its central part 15, an array of spacing sleeves 16; in the illustrated embodiment of the chassis frame 1, the interface bracket 14 includes a series of three horizontally orientated spacing sleeves 16 which extend outwardly. The interface bracket 14 also includes one or more mounting units onto which a vehicular operational part can be secured. In the illustrated example of FIG. 3, the interface bracket 14 includes two mounting units namely a lug 17 extending downwards from the central part 15 and a mounting lug 18 projecting upwards form the central part 15. The lug 17 is provided with a bearing 19 onto which, for example, a spring eye 21 of suspension spring leaf 22 can connect. A transversal member 20 is suitably fastened onto the lug 18 which at its end is provided with a number of holes. The transversal member 20 can be used as a rear cabin suspension attachment. The interface bracket 14 is made of metal and can be obtained by stamping, die casting or machining.

The attachment of the rear and front frame rails 4 and 9 on each side of the chassis frame 1 can be carried out by means of connecting elements such as, for example, screws, rivet connections, fitted bolts or such like. More specifically the facing ends of a rear frame rail 4 and of a front frame rail 9 are both provided with the same array of holes 23 and 24; the arrays of holes 23 and 24 are provided in the respective webs 6 and 10 of the said rear frame rail 4 and front frame rail 9. The attachment is therefore carried out (i) by positioning the interface bracket 14 against the outward surface of the web 6 the rear frame rail 4, the spacing sleeves 16 of the interface bracket 14 coinciding with the array of holes of the rear frame rail 4 and (ii) by positioning the front frame rail 9 over the interface bracket 14, the inward surface of the web 10 abutting against the spacing sleeves 16 and the array of holes 23 of the front frame rail 9 coinciding with the spacing sleeves 16 of the interface bracket 14. As can be seen by the cross section of FIG. 3, both rear and front frame rails 4 and 9 are similarly inwardly orientated. The upper and/or lower flanges 11 and 12 of the front frame rails 9 can each be provided with a cut 25 so as to enable the mounting units to emerge on the upper and/or lower side of the chassis frame 1. In the illustrated example, both upper and lower flanges are each provided with a cut 25 as the interface bracket incorporates a lug 17 for a suspension spring eye 21 that extends downwards and a mounting lug 18 that extends upwards.

Fastening means such as for example, bolts, rivets, or studs can be inserted in some or all of the holes provided in the rear and front frame rails 4 and 9 and in the spacing sleeves 16 to secure together the rear and front frame rails 4 and 9.

Figure 2:
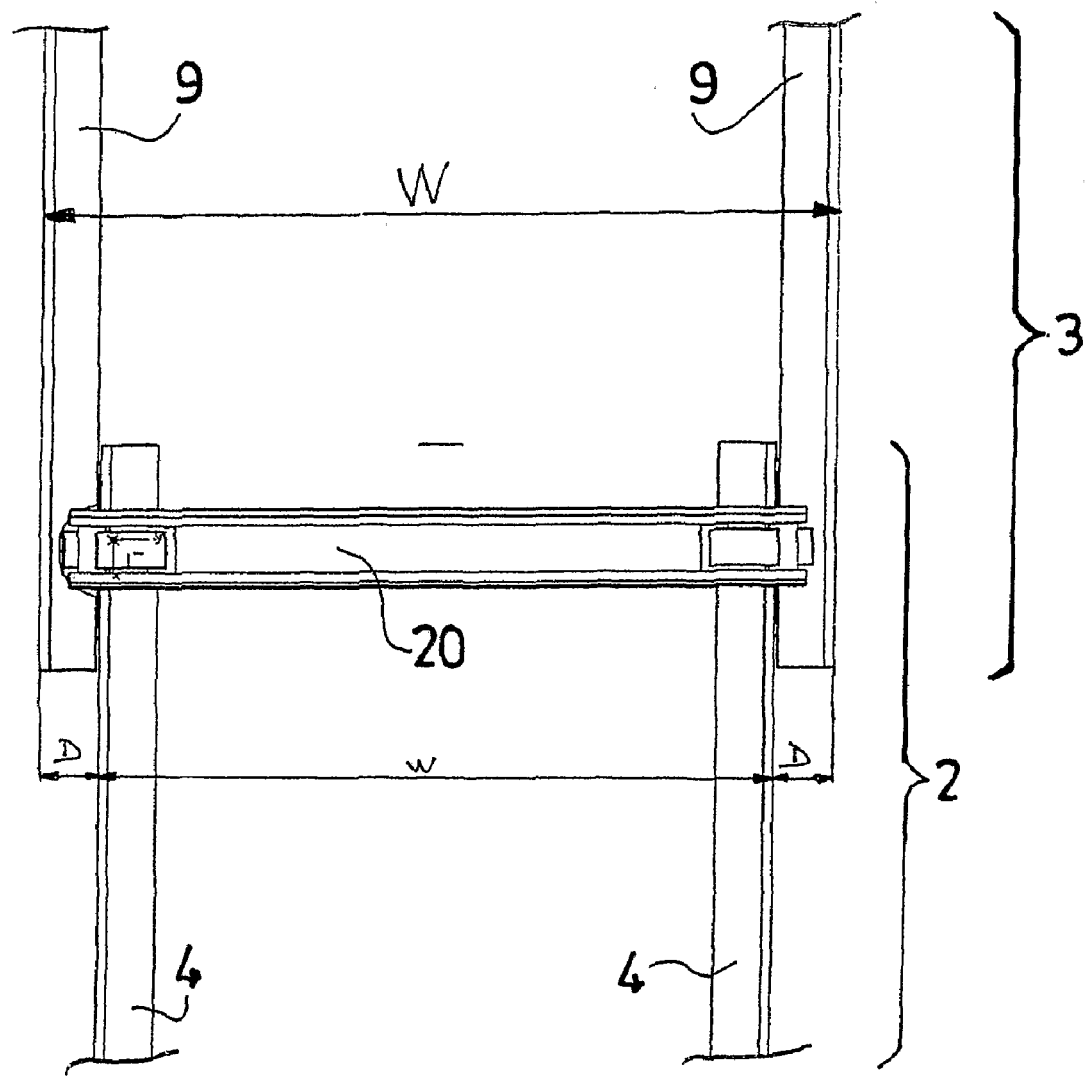
FIG. 2 shows the chassis frame in plan top view.

It can also be envisaged to weld the interface bracket 14 onto the rear frame rail and/or the front rail. FIG. 2 shows clearly that the chassis frame 1 has a rear chassis subsection 2 that exhibit a width w and, extending from the said rear chassis subsection 2, has a front chassis subsection 3 that exhibit a width W that is greater than the width w of the rear chassis subsection 2. The chassis frame width variation is set by the dimension D of the spacing sleeves 16 of the interface bracket 14. In the illustrated example, the dimension of the spacing sleeves 16 equals substantially the dimension of the upper and lower flanges 11 and 12 of the front frame rails 9;

thus the upper and lower flanges 11 and 12 of the front rails 9 abut against the web 6 of the rear frame rail 4.

As this appears in FIG. 2, the chassis frame 1 proves to be advantageous in terms of vehicle architecture.

The chassis frame 1 has a narrow rear subsection 2 which therefore makes space for large vehicular part such as for example fuel or air tanks, batteries etc that can be secured onto the web 4 of the rear subsection frame rails 4. The chassis frame 1 also has a wide front subsection 3 which can accommodate, for example, large engine and large cooling package.

Figure 4:
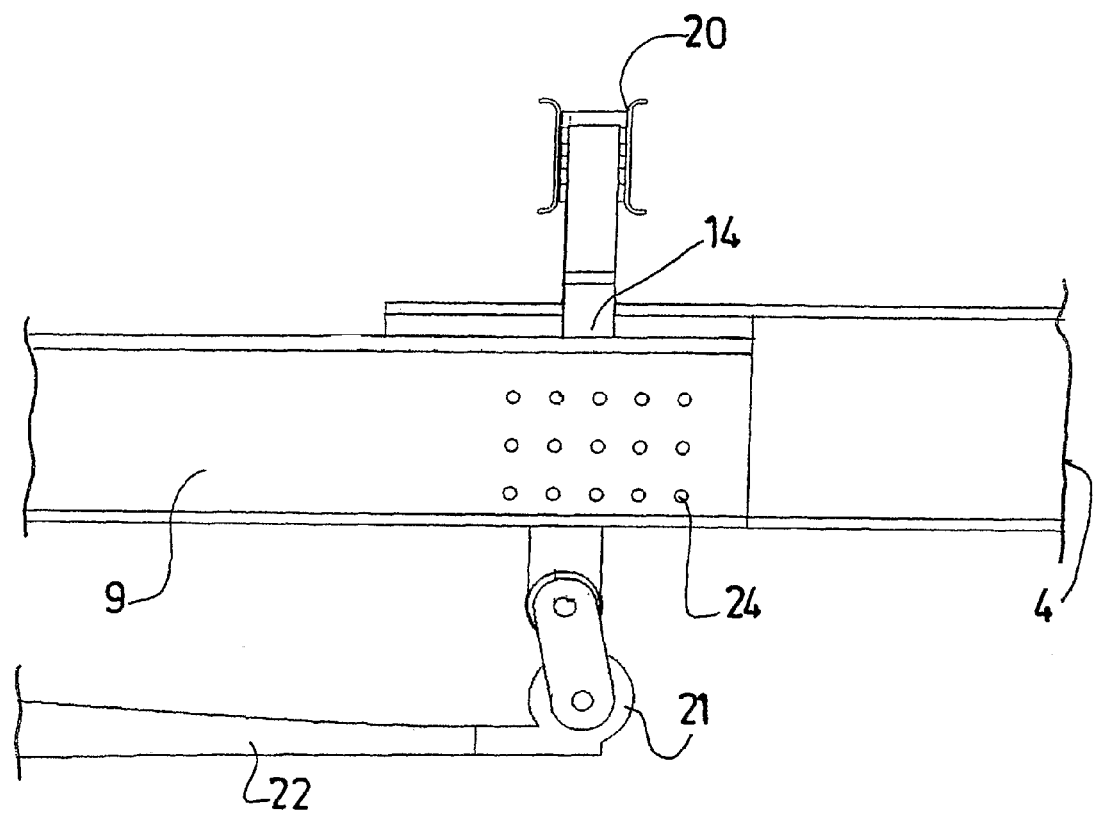
FIG. 4 is a side view of the chassis frame.

This is achieved by interposing at least two right and left interface brackets 14 between a rear chassis subsection 2 and a front chassis subsection 3. The said interface brackets 14 are also provided with mounting units upon which a number of vehicular parts can be secured. FIG. 4 illustrates a further advantage of the invention whereby the frame rails 4 and 9 of the rear subsection 3 and of the front subsection 9 can be of different height; they can also be of different material and/or have different thicknesses.

Figure 5:
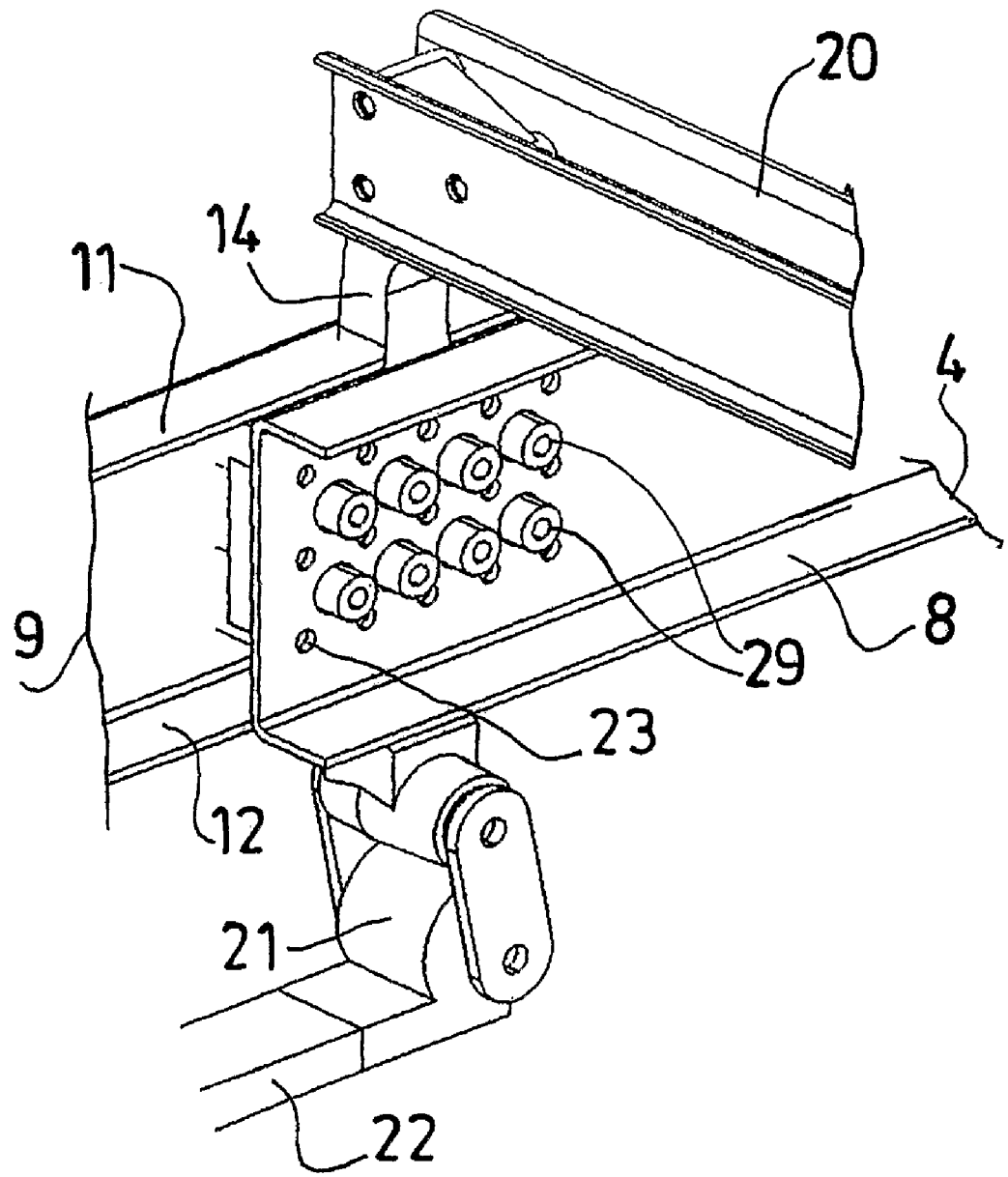
FIG. 5 is a fragmentary perspective view of the chassis frame.
Figure 6:
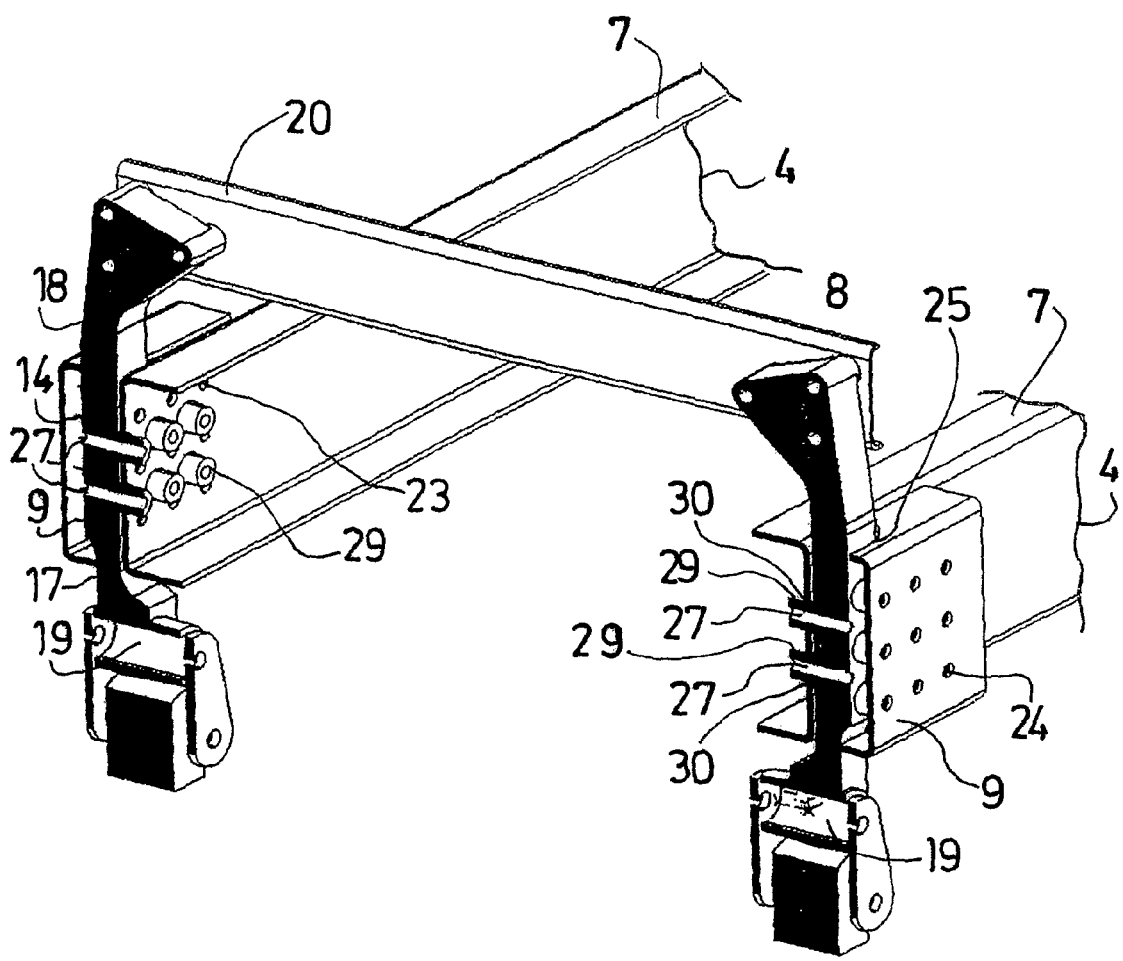
FIG. 6 is a cross section view according to VI-VI of FIG. 1.

FIGS. 5 and 6, respectively in perspective and in cross section, depict a further embodiment of the invention wherein a rear part of a vehicle engine (not illustrated) is secured onto the interface brackets 14.

In this embodiment, the interface bracket 14 includes an array of holes 27 that is inserted between the spacing sleeves 16. Each holes 27 of the second array of holes is extended by a flange ring 29. The rear frame rail 4 is provided with a second array of holes 30 the diameter of which substantially equals the external diameter of the flange ring 29; the second array of holes 30 is inserted between the already existing first array of holes 23.

Thus, as the interface bracket 14 is interposed between the rear frame rail 4 and the front frame rail 9, each flange ring 29 enters into a hole 30 of the second array. A series of fastening means such as bolts or threaded rods can be inserted into the holes 27 and their respective flange rings 29; this series of fastening means does not participate in any way to the attachment of the rear and front frame rails 4 and 9. Instead this series of fastening means is used to secure, for example, a silent block 33 upon which the rear part of an engine can sit. This proves to be an advantageous arrangement in terms of engine fastening insofar as the engine is not directly fastened onto the chassis frame but instead is secured onto the interface bracket 14 making the chassis frame less prone to vibrations.

The invention is not limited to the illustrative embodiments described above and shown in the drawings, but can be varied within the scope of the following patent claims.

It can be envisaged that the chassis frame includes three or more chassis subsections to suit the specific requirement of a vehicle.

The invention claimed is:

1. A chassis frame for a heavy vehicle having
a first chassis subsection having a first width w, and
at least a second chassis subsection adjacent to the first chassis subsection having a width W greater than the width w of the first chassis subsection,
each chassis subsection comprising right and left parallel C shaped frame rails inwardly open towards each other and extending longitudinally, a right interface bracket connecting two consecutive right frame rails belonging to two adjacent chassis subsections, the interface bracket maintaining a transversal distance D between the two consecutive right frame rails belonging to two adjacent subsections, a left interface bracket connecting two consecutive left frame rails belonging to two adjacent chassis subsections, the interface bracket maintaining the transversal distance D between the two consecutive left frame rails belonging to two adjacent subsections, the right and left interface brackets further including at least one mounting unit on which at least one vehicular operational part is attached.

2. The chassis frame according to claim 1, wherein each right interface bracket is interposed between two consecutive, overlapping right frame rails and each left interface bracket is interposed between two consecutive, overlapping left frame rails.

3. The chassis frame according to claim 1, wherein the right and left interface brackets each comprise
a central part that includes an array of spacing sleeves coinciding with an array of holes provided in a frame rail of the first chassis subsection and with an array of holes provided at the end of a subsequent frame rail of the second chassis subsection, and
at least one mounting unit on which a vehicular operational part can be secured.

4. The chassis frame according to claim 3, wherein each interface bracket includes at least one mounting unit of the group comprising:
a bearing provided in a lug extending downwardly from the central part capable of receiving a suspension spring eye;
a mounting lug extending upwards from the central part;
a mounting lug extending downwards from the chassis part;
a mounting lug extending longitudinally from the central part; and
an array of holes each extended by a flange ring capable of entering a second array of holes provided in the frame rails of the first chassis subsection.

5. The chassis frame according to claim 1, wherein the first chassis subsection is a rear vehicle chassis subsection and the second chassis subsection is a front chassis subsection.

6. The chassis frame according to claim 5, wherein each frame rail of the first chassis subsection is made of a vertical web and an upper and a lower flange that are provided with at least one cut to allow a passage for a mounting lug extending from the interface bracket.

7. The chassis frame according to claim 4, wherein each frame rail of the first chassis subsection is made of a vertical web and an upper and a lower flange that are provided with at least one cut to allow a passage for a mounting lug extending from the interface bracket.

8. The chassis frame according to claim 2, wherein the right and left interface brackets each comprise
a central part that includes an array of spacing sleeves coinciding with an array of holes provided in a frame rail of the first chassis subsection and with an array of holes provided at the end of a subsequent frame rail of the second chassis subsection, and
at least one or more mounting units on which a vehicular operational part can be secured.

9. The chassis frame according to claim 8, wherein each interface bracket includes at least one mounting unit of the group comprising:
a bearing provided in a lug extending downwardly from the central part capable of receiving a suspension spring eye;
a mounting lug extending upwards from the central part;
a mounting lug extending downwards from the chassis part;
a mounting lug extending longitudinally from the central part; and
an array of holes each extended by a flange ring capable of entering a second array of holes provided in the frame rails of the first chassis subsection.

10. The chassis frame according to claim 1, wherein each interface bracket includes at least one mounting unit of the group comprising:

a bearing provided in a lug extending downwardly from the central part capable of receiving a suspension spring eye;

a mounting lug extending upwards from the central part;

a mounting lug extending downwards from the chassis part;

a mounting lug extending longitudinally from the central part; and an array of holes each extended by a flange ring capable of entering a second array of holes provided in the frame rails of the first chassis subsection.

11. The chassis frame according to claim 1, wherein the at least one vehicular operational part is directly attached to the at least one mounting unit.

\* \* \* \* \*